(12) United States Patent
McKenzie

(10) Patent No.: US 6,438,297 B1
(45) Date of Patent: Aug. 20, 2002

(54) ASSEMBLY OF OPTICAL COMPONENT AND OPTICAL FIBRE

(75) Inventor: James Stuart McKenzie, Middlesex (GB)

(73) Assignee: Bookham Technology plc, Oxfordshire (GB)

( * ) Notice: Subject to any disclaimer, the term of this patent is extended or adjusted under 35 U.S.C. 154(b) by 0 days.

(21) Appl. No.: 09/306,438

(22) Filed: May 6, 1999

(30) Foreign Application Priority Data

May 28, 1998 (GB) .............................................. 9811358

(51) Int. Cl.$^7$ ................................................. G02B 6/30
(52) U.S. Cl. .............................. 385/49; 385/88; 385/52; 385/38
(58) Field of Search ............................ 385/49.88, 52.38

(56) References Cited

U.S. PATENT DOCUMENTS

| | | | | |
|---|---|---|---|---|
| 4,768,199 A | * | 8/1988 | Heinen et al. | 372/36 |
| 4,897,711 A | * | 1/1990 | Blonder et al. | 357/74 |
| 4,966,433 A | * | 10/1990 | Blonder | 385/88 |
| 5,071,213 A | | 12/1991 | Chan | 385/52 |
| 5,966,488 A | * | 10/1999 | Miura et al. | 385/93 |

FOREIGN PATENT DOCUMENTS

| | | |
|---|---|---|
| FR | 0 006 042 | 12/1979 |
| WO | WO97/1139 | 3/1997 |

* cited by examiner

Primary Examiner—Ellen E. Kim
(74) Attorney, Agent, or Firm—Fleshner & Kim, LLP

(57) ABSTRACT

The optical component (4) is mounted on an optical chip in alignment with an optical fibre (1) which is mounted within a V-groove (2) formed in the chip, the optical component (4) has two non-parallel location surfaces (4A, 4B) which abut against corresponding location features (5, 6) on the chip to locate the component (4) in a first direction (Y-axis) substantially perpendicular to the plane of the chip and in a second direction (Z-axis) which is perpendicular to said first direction (Y-axis) and substantially perpendicular to the length (X-axis) of the V-groove (2), and the optical component (4) is mounted on the chip so as to overhang one end (2A) of the V-groove to enable the end (1A) of the optical fibre (1) to be brought into a close, abutting relationship with the component (4).

17 Claims, 3 Drawing Sheets

ASSEMBLY OF OPTICAL COMPONENT AND OPTICAL FIBRE

BACKGROUND OF THE INVENTION

1. Field of the Invention

This invention relates to an assembly of an optical component and an optical fibre on a substantially planar substrate.

2. Description of the Prior Art

It is known to locate an optical fibre on a substantially planar substrate, such as a silicon chip, for coupling with a waveguide by locating the fibre in a V-groove formed in the surface of the chip. Such V-grooves are typically formed by a wet etch process and due to the crystallographic properties of silicon, the end face of such a V-groove is inclined rather than being perpendicular to the plane of the chip. Accordingly, to mount an optical fibre in the V-groove, in close, abutting relationship with a waveguide formed on the surface of the chip, it has been proposed to form the waveguide so that it overhangs the end of the V-groove. Such an arrangement is described in WO97/42534. The waveguide formed on the chip transmits light received from the optical fibre to an optical component mounted on the chip, or vice versa.

The present invention seeks to extend this idea to provide an optical coupling between an optical fibre and an optical component, such as a light emitter, light transmitter or light receiver, mounted on the chip.

SUMMARY OF THE INVENTION

According to the present invention, there is provided an assembly of an optical component and an optical fibre, the optical component being mounted on a substantially planar substrate in alignment with the optical fibre which is mounted within a V-groove formed in the substrate, the optical component having two non-parallel location surfaces which abut against corresponding location means on the substrate to locate the component in a first direction substantially perpendicular to the plane of the substrate and in a second direction which is perpendicular to said first direction and substantially perpendicular to the length of the groove and the optical component being mounted on the substrate so as to overhang an inclined end face of the V-groove to enable the end of the optical fibre to be brought into a close, abutting relationship with the component.

Preferred and optional features of the invention will be apparent from the following description and from the subsidiary claims of the application.

BRIEF DESCRIPTION OF THE DRAWINGS

The invention will now be further described, merely by way of example, with reference to the accompanying drawings, in which.

DETAILED DESCRIPTION OF THE INVENTION

Figure 1:
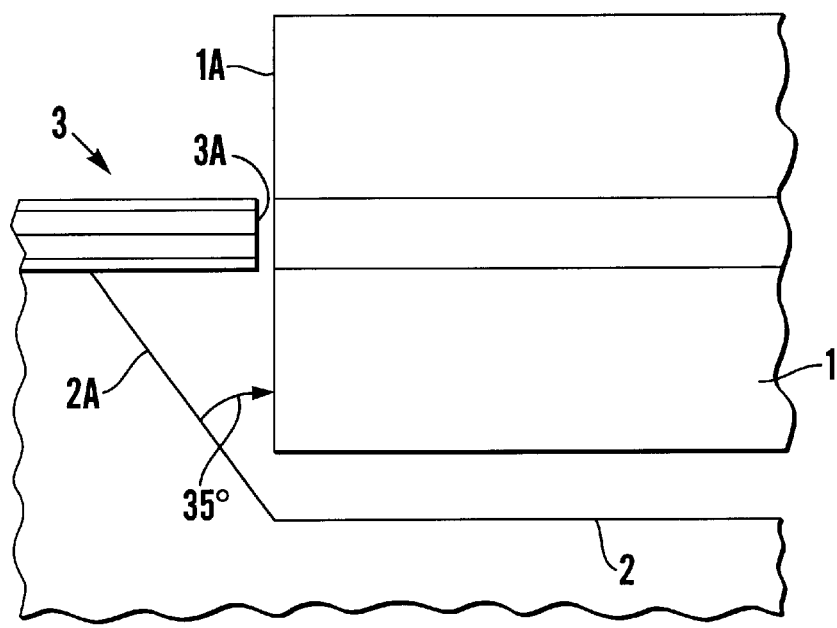
FIG. 1 is a schematic side view showing a known coupling between an optical fibre and a waveguide as described in WO97/42534.

FIG. 1 shows an optical fibre 1 located in a V-groove 2 in a silicon-on-insulator chip in alignment with a rib waveguide 3 formed in the upper silicon layer of the chip and shows how the waveguide overhangs the inclined end face 2A of the V-groove so as to enable the end face 1A of the fibre to be brought into a close, abutting relationship with the end face 3A of the waveguide 3.

It should be noted that "close, abutting relationship" as used herein means either that the respective faces are in contact with each other, or are positioned very close to each over (e.g. less than 15 microns apart) so as to provide a low loss optical coupling therebetween. The optical loss associated with the coupling should preferably be 1 dB or less.

It should also be noted that "alignment" between the optical component and an optical fibre or optical waveguide as used herein means that the light input or output region thereof is in alignment with an end face of the optical fibre or optical waveguide so as to provide a low loss coupling therebetween and does not necessarily mean that the optical axes of the component and optical fibre or optical waveguide are co-axial.

Figure 2:
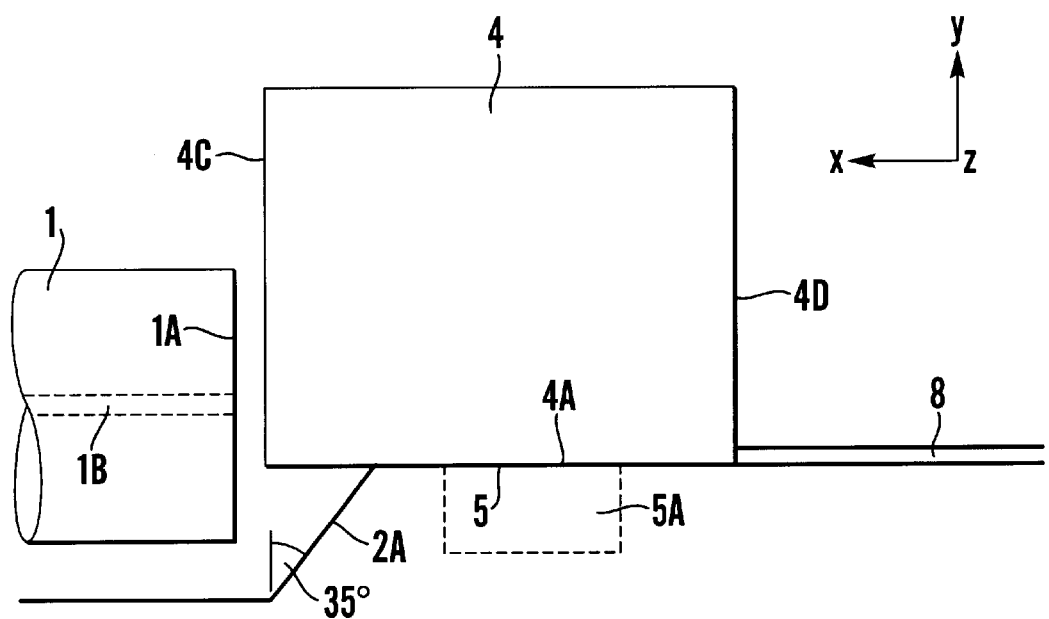
FIG. 2 is a schematic side view of an assembly according to a first embodiment of the invention.
Figure 3:
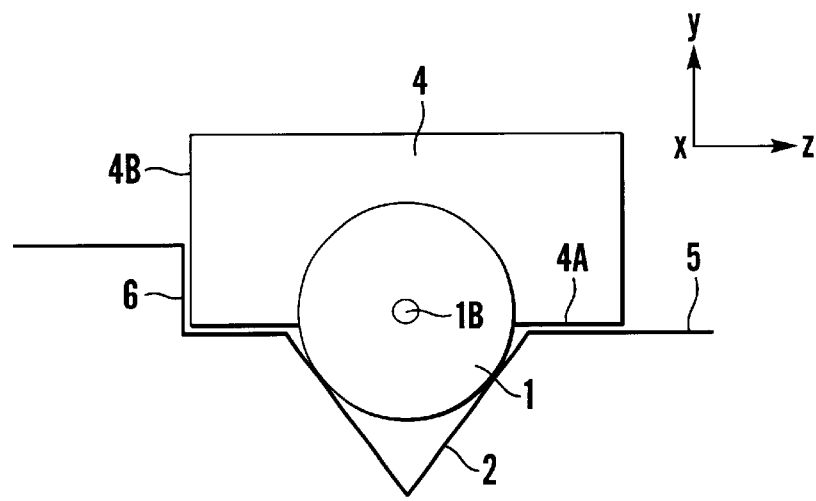
FIG. 3 is a schematic end view of the assembly in direction A shown in FIG. 2.

FIGS. 2 and 3 show a first embodiment of the invention which provides a direct coupling between an optical fibre 1 located in a V-groove 2 and an optical component 4 mounted on the chip.

The optical component 4 may comprise a light emitter, such as a laser diode, a light receiver, such as a photodiode, or a light transmitter, such as a semiconductor optical amplifier. The optical component 4 is mounted on the chip so as to overhang the inclined end face 1A of the V-groove so a light input or output region of the component can be positioned in a close, abutting relationship with the end face 1A of an optical fibre located in the V-groove. In order to align the light input or output region of the optical component 4 with a core 1B of the optical fibre, the component is provided with at least two, non-parallel location surfaces which abut against location means on the substrate to locate the component 4 in a vertical direction, i.e. a direction perpendicular to the plane of the chip (along the Y-axis as shown in FIG. 2), and in a lateral direction (along the Z-axis as shown in FIG. 2) which is substantially perpendicular to the length of the groove 2 (which extends along the X-axis shown in FIG. 2).

The base 4A of the optical component 4 may, for instance, comprise a first location surface which abuts against an upper surface 5 of the chip to locate the component in the direction of the Y-axis. A side face 4B of the component may form a second location surface which abuts against location means on the chip such as the side face 6 of a step as shown in FIG. 3. The location of the surface 5 and the face 6 may be accurately determined by standard photolithographic techniques. The location of surface 5 and face 6 are also accurately defined relative to the location of the V-groove and their location is preferably determined by the same lithographic steps used to determine the location of the V-groove so they are automatically aligned therewith. The component 4 may be provided with the location surfaces 4A and 4B during manufacture thereof or may be modified to provide these surfaces so the location of the surfaces relative to the light input or output region of the component is accurately defined.

The component 4 may thus be passively aligned with the V-groove by mounting it on the chip with its base 4A on the upper surface 5 of the chip and its side face 4B abutting the side face 6 on the chip. The component 4 may be secured in place by means of adhesive or solder. The adhesive or solder is preferably not provided between the base 4A and surface 5 or between the side face 4B and the face 6 but may be provided in a recess 5A formed in the upper surface 5 of the chip so as not to disturb the accurate location of the component against the surface 5 and face 6. The recess 5A may be similar to that used in the arrangement described in WO97/43676 described further below.

A fibre 1 may be located in the V-groove either before or after the component 4 is mounted on the chip. In either case, the fibre 1 can be positioned so its end face 1A lies in a close, abutting relationship with an end face 4C of the component in which the light input or output region thereof is located. The end face 4C of the fibre 1 may be brought into contact with end face 4C of the component or may be spaced a small distance therefrom, e.g. up to 15 microns, so as to provide a low loss optical communication therebetween, e.g. with a loss of 1 dB or less. Projections (not shown) may be provided adjacent the end of the V-groove to provide stop means against which the end face 1A of the fibre abut when it is located in the V-groove and slid along the groove towards the component 4.

The gap between the end face 1A of the fibre and the end face 4C of the component may also be filled with index matching material the refractive index of which is matched to the refractive index of the optical fibre.

By this means, the optical fibre is mounted in direct optical communication with the component 4 without the need for a waveguide therebetween (as is required in the prior art).

As indicated above, the optical component 4 may be a light source, light receiver or light transmitter. In the latter case, a waveguide 8 is provided to transmit light to or from a light receiving or light output region on an end face 4D of the component opposite the end face 4C.

The waveguide 8 is preferably a rib waveguide such as described in WO95/08787 and in the other references mentioned therein.

It will be appreciated that, in this case, the component 4 also needs to be positioned accurately with respect to the waveguide 8 so as to provide low loss optical communication therebetween. The locating means used to locate the component 4 relative to the V-groove may also be used to locate the component relative to the waveguide 8. Preferably, the location of the V-groove, the surfaces 5 and 6, and the waveguide 8 are all determined by the same lithographic step so these components are automatically aligned with each other.

Figure 4:
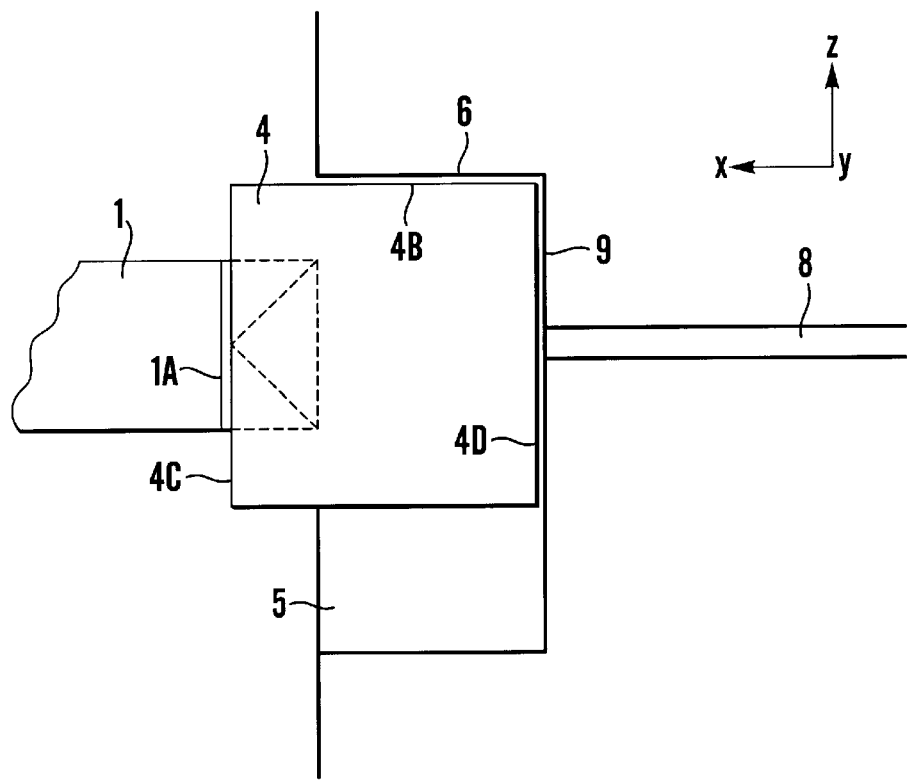
FIG. 4 is a schematic plan view of the assembly shown in FIGS. 2 and 3.

The position of the component 4 in the direction of the X-axis may also be determined by abutting the end face 4D against a side face 9 of a further step provided. in the surface of the chip (see FIG. 4).

As shown in FIG. 4, a location recess is provided in the chip having a side face 6, an end face 9 and a base 5 for locating the position of the component 4 relative to the V-groove. This location recess may be similar to that described in WO97/43676 except that it is arranged so that the component 4 overhangs the end of the V-groove. In some cases, the position of the base 5 may be determined by an interface of the insulating layer in the silicon-on-insulator chip, i.e. the upper surface of the insulating layer or the interface between the lower surface thereof and the underlying substrate once the insulating layer has been etched away, as described in WO97/43676.

The arrangement shown in FIG. 2 is particularly suited to the mounting of a semi-conductor optical amplifier (SOA) in communication between an optical fibre 1 and an integrated waveguide 8 as it is often desirable to amplify an optical signal following processing of the signal by an integrated optical circuit due to losses caused thereby before the signal is transmitted along an optical fibre. Mounting the amplifier at the edge of the chip overhanging the V-groove avoids the additional complications involved in hybridising the amplifier within a waveguide part-way across a chip and also introduces only one further interface in the optical path so further reducing optical losses.

Figure 5:
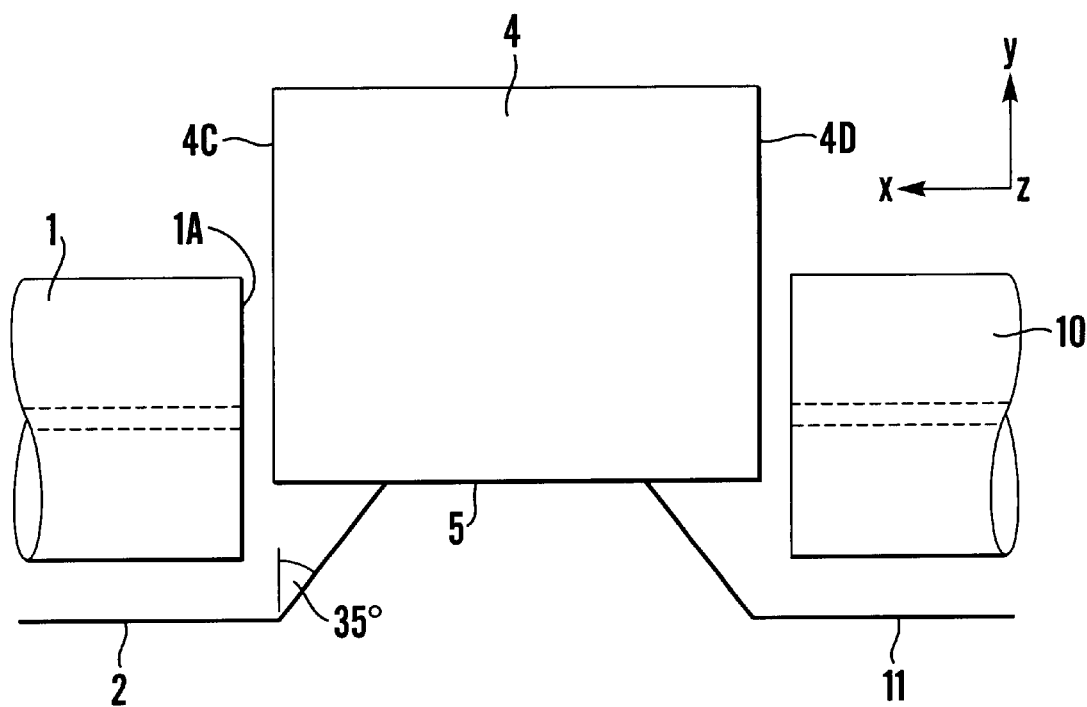
FIG. 5 is a schematic side view of an assembly according to a second embodiment of the invention.

FIG. 5 shows a second embodiment of the invention in which an optical component 4 is mounted in optical communication with two optical fibres 1 and 10. The mounting and alignment of the component 4 with respect to the first optical fibre 1 is similar to that described above in relation to FIGS. 1 and 2. The mounting and alignment of the component with respect to the second optical fibre 10 is achieved in a similar manner so the component is mounted on the chip with one end of the component 4 overhanging the end of the V-groove 2 and the opposite end of the component 4 overhanging the end of another V-groove 11.

It will be appreciated that, in the arrangement shown in FIG. 5, the same side face 6 of a step in the upper surface of the chip can be used to align the component in the direction of the Z-axis with respect to both the first fibre 1 and the second fibre 10. The component may be located in the direction of the X-axis by abutment of a further location feature, eg a step in the side face of the component (not shown), against further location means on the chip, eg a further step provided thereon (not shown).

It should be noted that the end faces of the optical fibres 1, 10 and the end face of the waveguide 8 may be angled so as to reduce back-reflection therefrom. Accordingly, the optical axes of the optical fibres 1, 10 and waveguide 8 may lie at an angle to the optical axis of the component 4 to ensure the light travels along the optical axes of the fibres 1, 10 and waveguide 8 (according to Snell's Law). The angle between the optical axis of the component and the optical axes of the fibres 1, 10 or waveguide 8 would typically be less than 10 degrees and, in many cases, less than 5 degrees.

Although the enbodiments described above have been described in relation to a silicon-on-insulator chip, it will be appreciated that a similar assembly may be provided on other forms of chip, e.g. a silicon chip or a silica chip.

Other optical components may also be mounted in a similar way.

In addition to overcoming the problems associated with the inclined end face of a V-groove, location of an optical component at the edge of a chip so that it overhangs the inclined end-face of a V-groove, also has the advantage that fabrication of the assembly is easier as the component only needs to be abutted against one location feature in the direction of the X-axis rather than having to be accurately aligned within location means provided in a waveguide part-way across a chip. The arrangement also introduces only one additional interface in the optical path rather than two or more interfaces if the component is mounted within a waveguide part-way across a chip. In addition, the assembly is robust. The optical component would typically have dimensions, eg a length of 250 microns or more, significantly greater than the length of the overhang (typically about 4 microns) so the component can be securely affixed to the chip despite the overhang and the use of a relatively fragile overhanging waveguide as described in WO97142534 is avoided.

I claim:

1. An assembly, comprising:

an optical fiber; and an optical component having a top surface, a bottom surface and four side surfaces, wherein the bottom surface of the optical component is mounted on a top surface of a substantially planar substrate in alignment with the optical fiber which is mounted within a V-groove formed in the top surface of the substrate, the optical component having two non-parallel location surfaces which abut against corresponding location means on the top surface of the substrate to locate the component in a first direction substantially perpendicular to the plane of the substrate and in a second direction which is perpendicular to said first direction and substantially perpendicular to the length of the groove and the bottom surface of the optical component being mounted on the top surface of the substrate so as to overhang in parallel an inclined end face of the V-groove, wherein the end face of the optical fiber is in a close, abutting relationship with one of the side surfaces of the component, wherein the location means on the substrate for locating the component in the said second direction is independent of the V-groove and comprises a side face of a first step formed in the substrate.

2. As assembly as claimed in claim 1 in which the location means on the substrate for locating the component in the said first direction comprises a first surface parallel to the plane of the substrate.

3. An assembly as claimed in claim 1, comprising g further location means for locating the component in a third direction parallel to the length of the V-groove.

4. An assembly as claimed in claim 3 in which the further location means comprises a side face of a second step formed in the substrate.

5. An assembly as claimed in claim 4 in which a first step is formed in the substrate and wherein the first and second steps comprise sides of a recess formed in the substrate.

6. An assembly as claimed in claim 4, in which the optical component is also aligned with a waveguide provided on the substrate.

7. An assembly as claimed in claim 6 in which the waveguide is a rib waveguide.

8. An assembly as claimed in claim 6, in which the component comprises an optical transmitter, or a semiconductor optical amplifier.

9. An assembly as claimed in claim 1, in which the optical component is also aligned with a second optical fibre, the second optical fibre being located in a second V-groove formed in the substrate and the bottom surface of the optical component being mounted on the top surface of the substrate so as to overhang an inclined end face of the second V-groove, wherein the end face of the second optical fiber is in a close, abutting relationship with one of the side surfaces of the component.

10. An assembly as claimed in claim 1, in which the component comprises a light receiver, a photodiode, a light emitter, or a laser diode.

11. An assembly as claimed in claim 1, in which the substrate comprises silicon.

12. An assembly as claimed in claim 11, in which the substrate comprises a silicon-on-insulator chip.

13. An assembly as claimed in claim 1, wherein the close, abutting relationship comprises a distance between the end of the optical fiber and the one of the side surfaces of the optical component of less than 15 $\mu$m.

14. An assembly, comprising:

an optical fiber; and an optical component having a top, a bottom and four side surfaces, wherein the bottom surface of the optical component is mounted on a top surface of a substantially planar substrate in alignment with the optical fiber which is mounted within a V-groove formed in the substrate, the optical component having two non-parallel location surfaces which abut against corresponding location means on the substrate to locate the component in a first direction substantially perpendicular to the plane of the substrate and in a second direction which is perpendicular to said first direction and substantially perpendicular to the length of the groove and the bottom surface of the optical component being mounted on the top surface of the substrate so a side portion of the optical component overhangs a portion of the V-groove, wherein the end face of the optical fiber is in a close, abutting, parallel relationship with the face of the side portion of the component which is planarly parallel to the end face of the fiber, and wherein the location means is separate from the V-groove.

15. An assembly as claimed in claim 15, wherein the close, abutting, parallel relationship comprises a distance between the face of the side portion of the optical component and the end face of the fiber of less than 15 $\mu$m.

16. An assembly, comprising:

an optical fiber; and an optical component having a top, a bottom and four side surfaces, wherein the bottom surface of the optical component is mounted on a top surface substantially planar substrate in alignment with the optical fibre which is mounted within a V-groove formed in the substrate, the optical component having two non-parallel location surfaces which abut against corresponding location means on the substrate to locate the component in a first direction substantially perpendicular to the plane of the substrate and in a second direction which is perpendicular to said first direction and substantially perpendicular to the length of the groove and the bottom surface of the optical component being mounted on the top surface of the substrate so as to overhang an inclined end face of the V-groove, wherein the end of the optical fiber is in a close, abutting, parallel relationship with the one of the side surfaces of the component, wherein the location means on the substrate for locating the component in the said second direction comprises a side face of a rectangular spaced first step formed in the substrates and wherein the location means is separate from the V-groove.

17. An assembly as claimed in claim 16, wherein the close, abutting, parallel relationship comprises a distance between the one of the side surfaces of the optical component and the end face of the fiber of less than 15 $\mu$m.

* * * * *